July 19, 1960
E. H. MILLER
2,945,324
FISHING SINKER
Filed Oct. 28, 1958
2 Sheets-Sheet 1
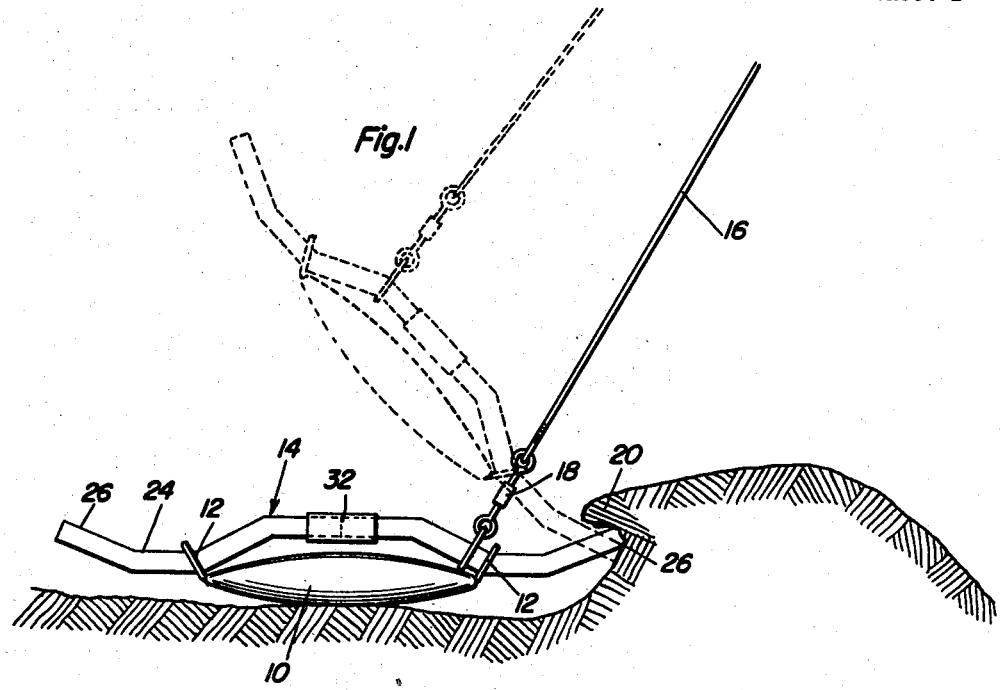
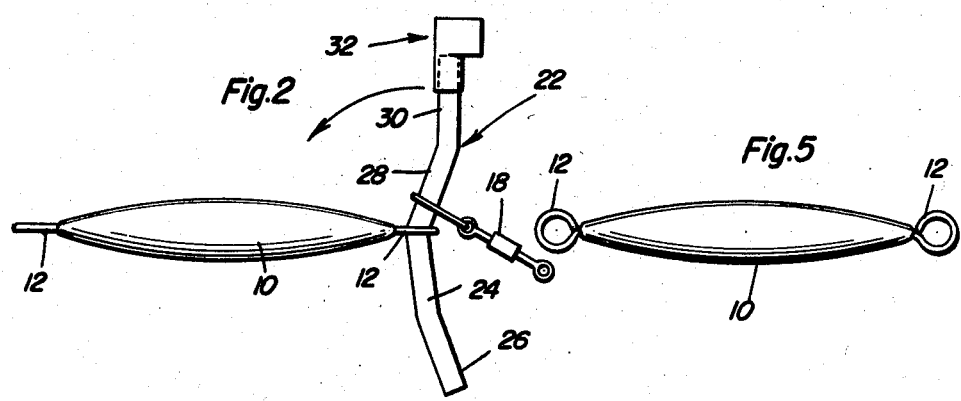
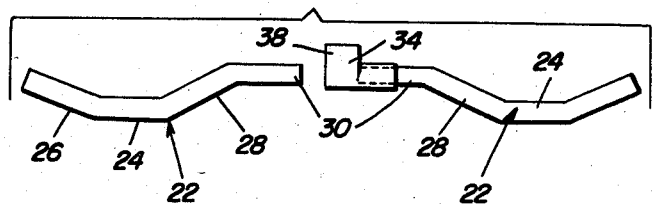
Ervan H. Miller
INVENTOR.
BY July 19, 1960
E. H. MILLER
2,945,324
FISHING SINKER
Filed Oct. 28, 1958
2 Sheets-Sheet 2
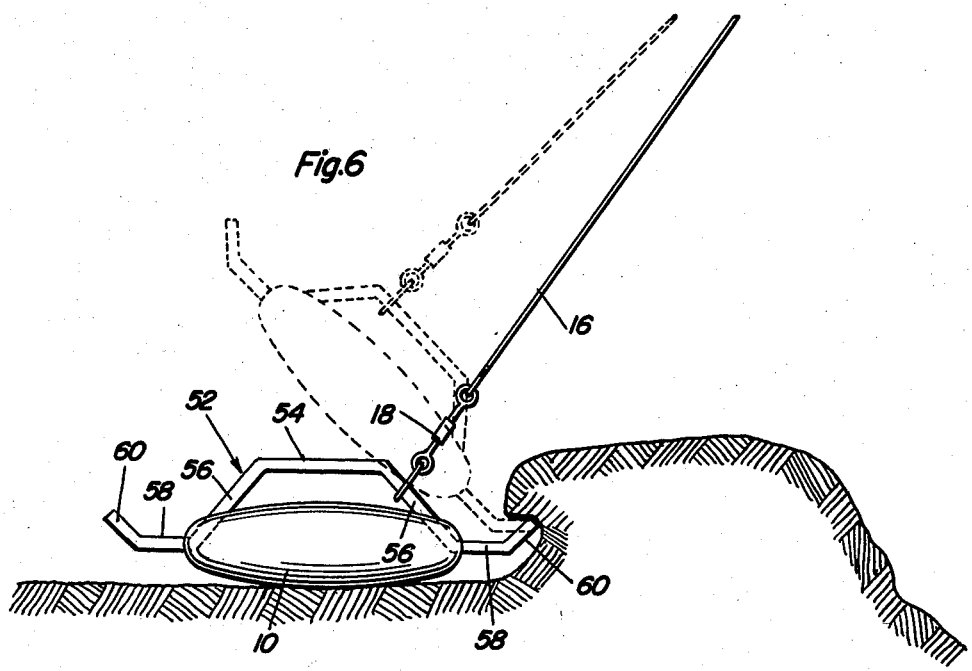
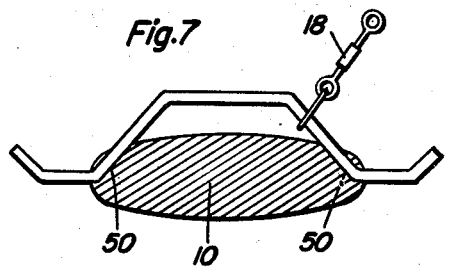
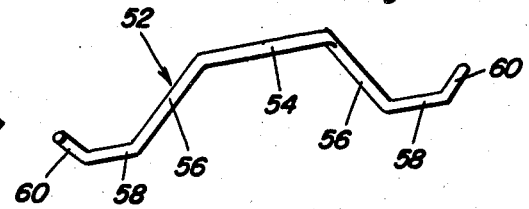
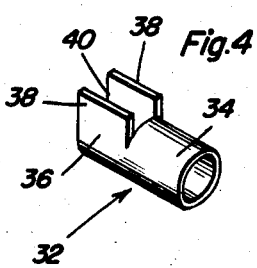
Ervan H. Miller
INVENTOR.
BY
Attorneys

United States Patent Office 2,945,324
Patented July 19, 1960

2,945,324

FISHING SINKER

Ervan H. Miller, Box 4–422, Spenard, Alaska

Filed Oct. 28, 1958, Ser. No. 770,136

6 Claims. (Cl. 43—44.97)

This invention comprises a novel and useful fishing sinker, comprises a continuation-in-part of my copending application Serial No. 736,534, filed May 20, 1958, and which has been now abandoned, and more particularly relates to a non-fouling fishing sinker which will be self-releasing from underwater obstructions.

This invention comprises a novel and useful fishing sinker and more particularly relates to a non-fouling fishing sinker which will be self-reelasing from underwater obstructions.

The primary purpose of this invention is to provide a fishing sinker construction which will be self-releasing from underwater obstacles, such as stones or the like.

A further object of the invention is to provide a fishing sinker construction of a self-releasing type in which an elongated guard member of a novel construction shall be secured in a novel and improved manner to a fishing sinker to effect by the pull of the fishing line the release of the fishing sinker after the same has encountered underwater obstructions.

A further object of the invention is to provide a novel and effective guard construction for fishing sinkers which may be readily attached thereto in an easy and convenient manner and shall function to utilize the tension of a fishing line to which the sinker is attached for effecting a tilting or turning movement of the sinker to thereby disengage the sinker from underwater obstructions encountered by the sinker.

Still another object of the invention is to provide a novel and effective guard construction for fishing sinkers wherein the guard member shall be rigidly and permanently attached to the body portion of the fishing sinker.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a somewhat diagrammatic view indicating in elevation in solid lines the manner in which the novel fishing sinker construction of this invention is attached to a fishing line and in which the guard member of the sinker encounters an underwater obstruction, while in dotted lines is shown the manner in which the tension of the fishing line serves to tilt or turn over the sinker and thereby release the same from an underwater obstruction;

Figure 2 is a somewhat diagrammatic view showing in elevation the manner in which a portion of the guard member of the sinker is inserted through a sinker eye for attachment thereto, the arrow in Figure 2 showing the direction of movement in applying the guide member to the sinker;

Figure 3 is a group view in side elevation of the two components which make up the guard member of the sinker;

Figure 4 is a perspective view of the connector by which the two components of the guard member are to be connected to each other;

Figure 5 is a side elevational view of the sinker body having a pair of deformable eyes at the opposite ends thereof for receiving and retaining the guard member of this invention;

Figure 6 is a view similar to Figure 1 but showing a modified form of the sinker;

Figure 7 is a view in vertical central longitudinal section through the sinker construction of Figure 6; and Figure 8 is a perspective view of the novel one-piece guard member forming a part of this embodiment of the invention.

A frequent difficulty encountered by fishermen is the tendency of a sinker attached to a fishing line encountering and being caught by underwater obstructions, such as beneath a rock, earth, or other underwater obstructions so that the tension upon the fishing line tends to lodge the sinker more securely in the obstruction resulting in a breaking of the line. The present invention relates generally to an attachment in the form of a guard member which may be applied to a sinker in a novel manner and to which the fishing line shall be connected by a swivel so that when an obstruction is encountered it will be engaged by the guard member, and the connection of the fishing line to the guard member results in tilting the sinker and its guard member to thereby effect disengagement of the guard member from the obstruction.

Referring first to the embodiment of Figures 1–5, and particularly to Figure 1, it will be seen that a conventional elongated sinker is indicated by the numeral 10 and as also shown in Figure 1, this sinker has at its opposite ends a pair of deformable eyes 12 projecting therebeyond. A rod-like guard member designated generally by the numeral 14 is inserted through these eyes and by bending and deforming the eyes thereon is securely clamped to the sinker body, the ends of the guard member extending beyond the opposite ends of the body as clearly shown in Figure 1. A fishing line 16 is connected as by the swivel 18 to the guard member 14 between the two eyes 12 so that the swivel connection is slidable longitudinally of the guard member.

As shown in Figure 1 the arrangement is such that when the sinker approaches an obstacle or obstruction, the longitudinally projecting end of the guard member will engage the obstruction such as that shown at 20, with the sinker body 12 being spaced from this obstruction. Consequently, when tension is applied to the line 16, there will be an upward tilting or pivotal movement of the combined sinker and guard member about the point of engagement of the guard member with the obstruction, as indicated by a comparison of the full and dotted line showing in Figure 1, so that the sinker will turn over upon itself and disengage from the obstruction.

As shown in Figure 3, in connection with Figure 1, the guard member 14 comprises a pair of preferably identical rod-like elements, members or sections, these rods being designated by the numeral 22 each of these members being angulated, having a midportion 24 adapted to be received through the eyes 14 of the sinker body, with the opposite ends of the rods 22 being inclined away from the body of the sinker as at 26 so that these opposite ends project longitudinally beyond the ends of the sinker body. Adjacent the portion 22, the rods are provided with angulated or inclined portions 28 and terminate in adjacent end portions 30 which are adapted to be disposed in alignment with each other, or generally parallel with each other, and are generally parallel to the portions 24. It will be observed that the angulated relation of the portions 28 and 30 in conjunction with the portion 24 causes the rods 24 and 22 to be disposed in a generally parallel relation to the sinker body 10 as will be apparent from Figure 1.

A connector 32, see Figure 4, is employed to connect the two rod members of the guard member in aligned fixedly connected relation. This connector comprises a tubular end portion 34 adapted to snugly receive one of the adjacent ends 30 of one of the rods, while the other end of the connector comprises a U-shaped portion 36 having a pair of deformable side legs 38 thereon, these side legs thus providing a laterally extending slot 40 therebetween. As will be apparent from Figure 2 in connection with Figure 3, with the tubular portions 34 embracing and frictionally gripping one adjacent end 30 of a rod, the adjacent end 30 of the other rod may be moved laterally or endwise into the U-shaped portion 36 in alignment with the other rod end 30. When this relationship is established, the deformable legs 38 of the U-shaped member are bent upon each other, as shown in Figure 1, to thus secure and frictionally grip the adjacent end portions of the aligned other rod.

It will thus be evident that the guard member 14 is composed of inexpensive elements, which can be readily and quickly attached to a conventional sinker, it being understood that the swivel 18 is secured to one of the rod elements of a guard member prior to the connection of the adjacent ends of the rods to each other by the connector.

Referring now to the embodiment of Figures 6–8, it will be observed that the sinker body 10, adjacent its ends is provided with a pair of inclined bores or slots 50 therethrough. A guard member designated generally by the numeral 52 consists of a single rod-like element having a straight central portion 54 from the opposite ends of which extend a pair of angulated divergent straight portions 56. From the outer ends of the latter there project laterally outwardly a pair of straight further portions 58 which are parallel to the central portion 54, and the extremities of the latter are provided with upturned angulated ends as at 60. It will be observed that the portions 54, 56, 58 and 60 lie in a single plane.

In assembling the device of Figures 6–8, it may be preferred to provide the guard member 52 with the portions 56, 58 and 60 disposed in a straight line for ready insertion through the straight bores 50. Thereafter, the extremities may be bent into the shape shown in Figures 8 and 7.

Alternatively, it may be preferred to form the bores 50 as slots in the extremities of the body 10, with the guard member being initially shaped as shown in Figure 8. In this position the guard member may be placed in these slots, and the ends of the body 10 may be deformed or swaged over upon the guard member portions 56 and 58 at their junctions in order to firmly retain the guard member in place. The swivel 18 together with the line 16 is connected in the same manner previously described, and the operation of the device in this form of the invention is identical with that previously set forth. The advantages of this construction, however, is that it is cheaper to make since merely a single element is provided to form the guard member in contrast with the two elements 22 and the connector member 32. Further, the sinker body 10 is simple to manufacture since the eye portions 12 are omitted therefrom.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A non-fouling sinker for fishing lines comprising an elongated, weighted body having secured at its opposite ends an elongated guard member disposed longitudinally of said body with an intermediate upwardly offset portion spaced above said body, said guard member having its opposite ends protruding outwardly and upwardly beyond the opposite ends of said body, a fishing line secured to said intermediate portion and slidable thereon between said ends of said body.

2. The combination of claim 1 wherein said guard member comprises a pair of rods disposed in endwise relation, a connector securely joining the adjacent ends of said rods, said connector comprising a sleeve embracing said adjacent ends, said sleeve including a tubular end embracing one of said adjacent ends and a U-shaped portion receiving the other of said adjacent ends, said portion having deformable legs bendable upon said other of said adjacent ends for embracing the latter.

3. The combination of claim 1 wherein said body has deformable eyes at opposite ends thereof bendable upon said guard member and frictionally embracing the latter.

4. The combination of claim 3 wherein said intermediate portion has a straight central portion, said guard having angulated portions extending through said eyes and connecting said central portion to said ends of the guard, said angulated portions projecting beyond the ends of said body.

5. The combination of claim 1 wherein said guard has angulated portions connecting said intermediate portion to said ends of the guard, said angulated portions projecting beyond the ends of said body.

6. The combination of claim 5 wherein said guard has its angulated portions embedded and secured in said body inwardly of the ends of the guard.

References Cited in the file of this patent

UNITED STATES PATENTS

| | | |
|---|---|---|
| 2,109,693 | Gaines | Mar. 1, 1938 |
| 2,798,332 | Garrison | July 9, 1957 |